T. H. BLAIR.
KINETOGRAPH.
APPLICATION FILED NOV. 29, 1909.
1,153,887.
Patented Sept. 21, 1915.
3 SHEETS—SHEET 3.
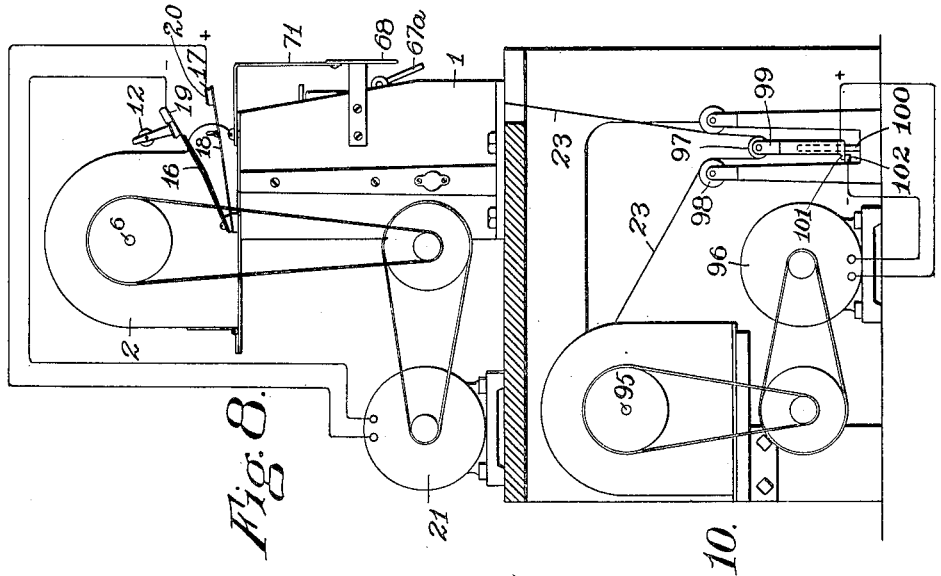
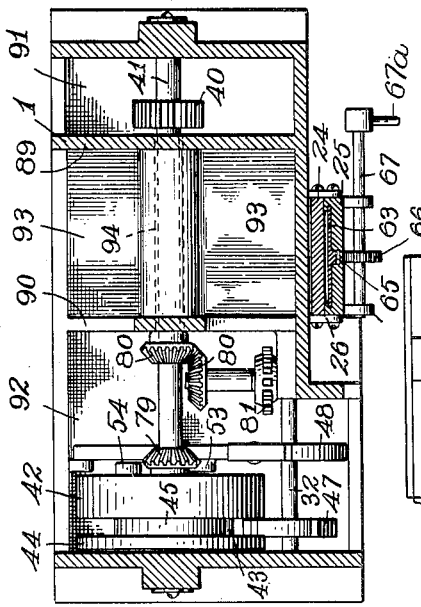
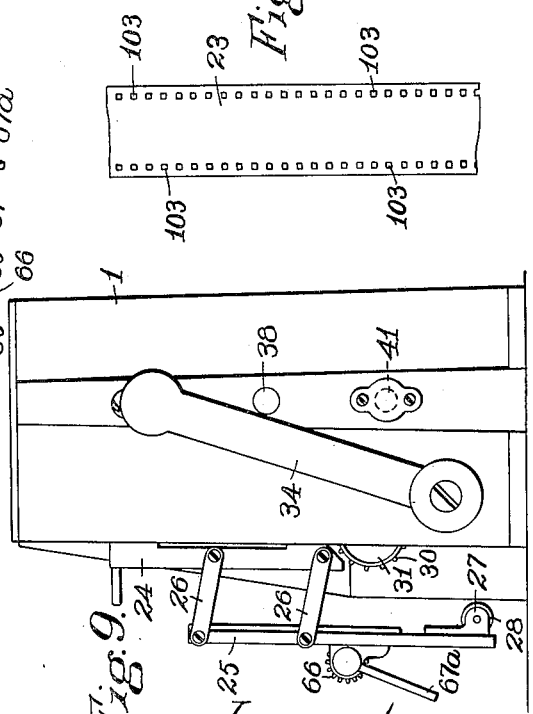
Witnesses
Roy D. Tolman.
Penelope Comberbach.
Inventor
Thomas H. Blair.
By Rufus B. Fowler
Attorney

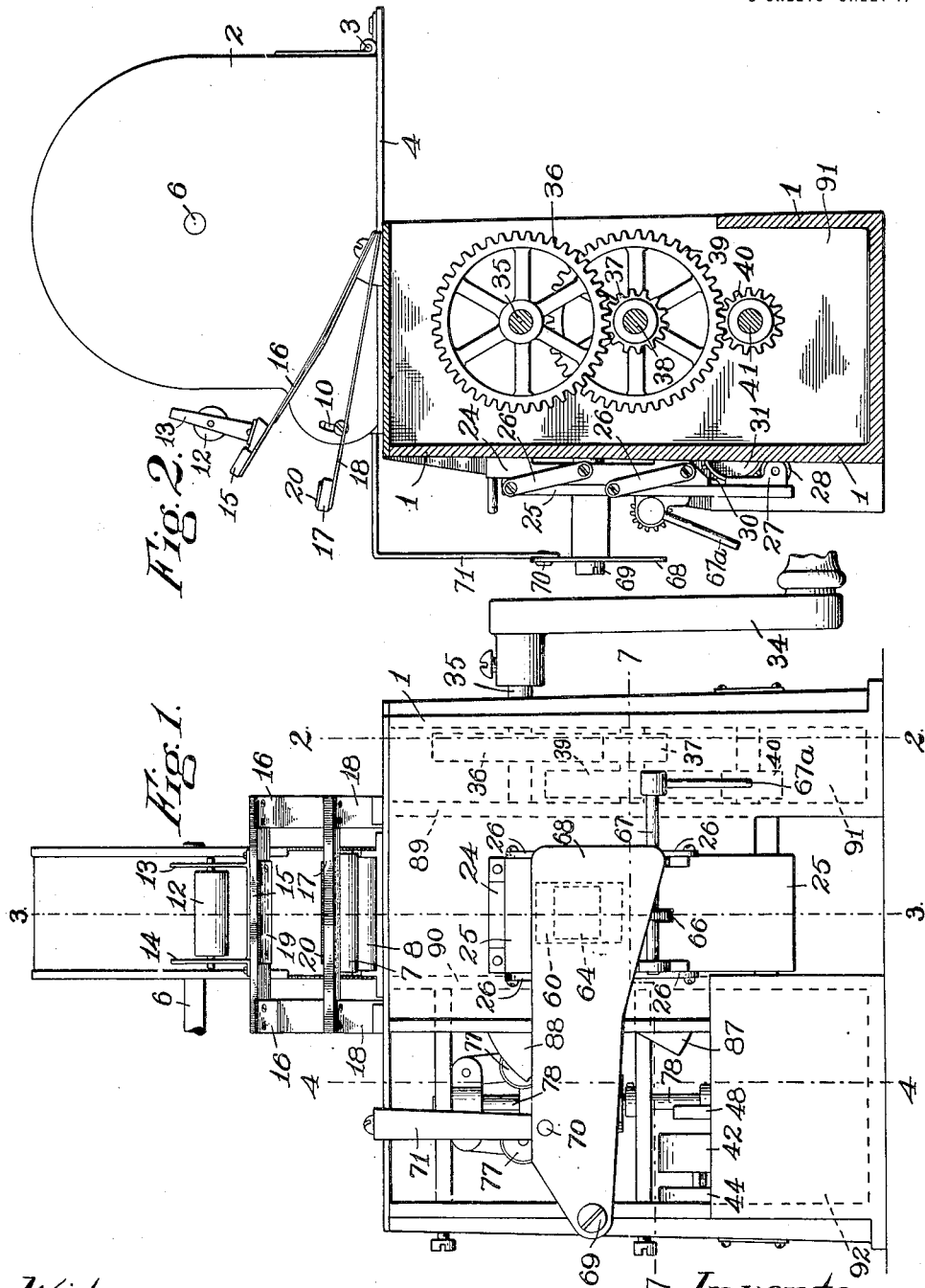

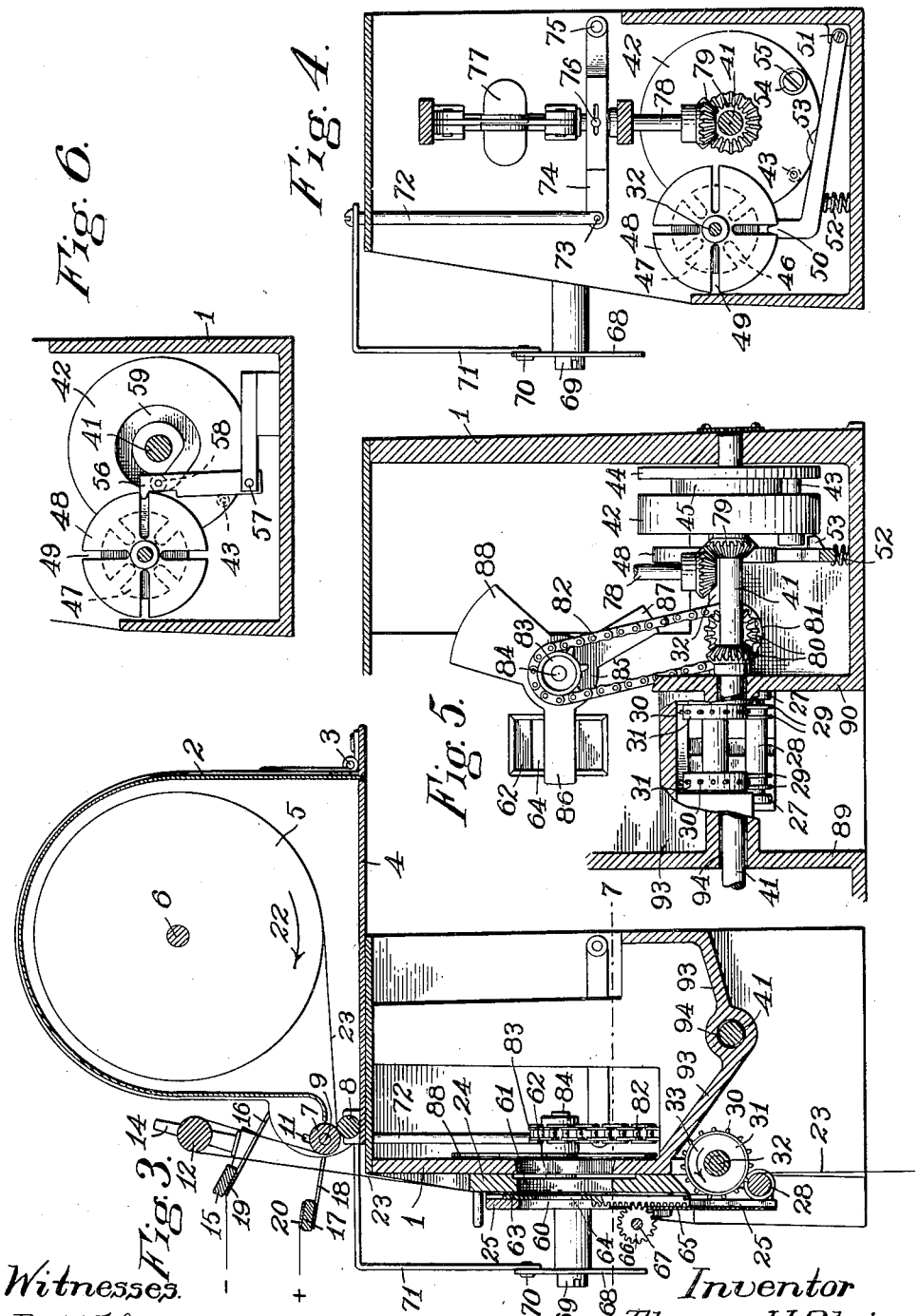

UNITED STATES PATENT OFFICE.

THOMAS H. BLAIR, OF NORTHBORO, MASSACHUSETTS, ASSIGNOR TO WHITING MANUFACTURING COMPANY, OF NORTHBORO, MASSACHUSETTS, A CORPORATION OF MASSACHUSETTS.

KINETOGRAPH.

1,153,887. Specification of Letters Patent. Patented Sept. 21, 1915.

Application filed November 29, 1909. Serial No. 530,302.

*To all whom it may concern:*

Be it known that I, THOMAS H. BLAIR, a citizen of the United States, residing at Northboro, in the county of Worcester and Commonwealth of Massachusetts, have invented a new and useful Improvement in Kinetographs, of which the following is a specification, accompanied by drawings forming a part of the same, in which—

Figure 1 represents a rear view of a kinetograph embodying my improvements. Fig. 2 is a side view, shown in section, on the plane of the broken line 2—2, Fig. 1. Fig. 3 is a side view, shown in section, on the plane of the broken line 3—3, Fig. 1. Fig. 4 is a side view, shown in section, on the plane of the broken line 4—4, Fig. 1. Fig. 5 is a front view of a portion of the operative mechanism. Fig. 6 is a side elevation of a modified form of the locking mechanism. Fig. 7 is a plan view, shown in section, on the plane of the broken line 7—7, Fig. 1. Fig. 8 is a side view embodying the motors for rotating the film coil in delivering and rewinding the film with the device for controlling the rewinding. Fig. 9 is a side view of the plate 25 and flanged roll 28 withdrawn to allow the film to be passed over the sprocket wheels 31. Fig. 10 is a detached view of a portion of the continuous film.

Similar reference characters refer to similar parts in the different views.

The objects of my present invention are to provide improved mechanisms for delivering a continuous film from a coil or reel; for intermittently feeding the film; for controlling the rewinding of the film and to rearrange the operative parts of the mechanism, whereby greater compactness and simplicity of construction is secured, and these objects, among others, are accomplished by the construction and arrangement of parts as hereinafter described and pointed out in the annexed claims.

Referring to the accompanying drawings, 1 denotes a casing inclosing the mechanism for intermittently feeding the film and operating the screen and fire shutter. Mounted upon the casing 1 is a reel cover 2 hinged at 3 to an overhanging leaf 4 supported upon the top of the casing 1. The cover 2 shuts over and incloses a coil of continuous film 5 carried upon a spindle 6 and delivered at the rear side of the cover between the rolls 7 and 8, the roll 8 being journaled in fixed bearings upon the leaf 4, and the roll 7 being journaled on a spindle 9 which is adjustably held at its ends in slots 10 and 11 in the cover 2. The continuous film passes between the rolls 7 and 8 and over a roll 12 journaled in posts 13 and 14 mounted upon a cross bar 15, which is supported at its ends upon the free ends of blade springs 16, 16 which have their opposite ends attached to the top of the casing 1. Beneath the cross bar 15 is a similar cross bar 17, having its ends supported upon the free ends of blade springs 18, 18 which have their opposite ends attached to the top of the casing 1.

Upon the under side of the cross bar 15 is an electrical contact strip 19 and upon the upper side of the cross bar 17 is a similar electrical contact strip 20, arranged to strike each other as the free ends of the springs 16 and 18 are brought together. The contact strips 19 and 20 form the terminals of an electric circuit which includes a motor 21, Fig. 8, having its spindle operatively connected with the spindle 6 of the film coil 5 so that, when the spindle 6 is rotated by the motor, it will be turned in the direction of the arrow 22, Fig. 3, in order to deliver the film from the coil. In the normal position of the springs 16 and 18, the free ends of the latter are raised some distance above the casing 1, and the free ends of the former are maintained in a raised position above the springs 18. When the springs are thus separated the electric circuit will remain broken and the motor 21 inoperative and the film, as indicated by the line 23, will be intermittently drawn from the coil between the rolls 7 and 8 and over the roll 12 by the sprocket wheels 31 operated by the crank 34, as hereinafter described.

Whenever the resistance to the delivery of the film exceeds the tension of the spring 16, the latter will be depressed, bringing the contact strips 19 and 20 together and completing the electric circuit by which the motor 21 is put in operation, thereby rotating the coil 5 in the direction of the arrow 22 until the loose film is delivered from the coil, allowing the spring 16 to resume its normal position and thereby break the electric circuit. If the tension upon the film is not released as soon as the contact strips 19 and 20 are brought together, both of the springs 16 and 18 will be depressed until the tension is released. The tension upon the strip of film is, therefore never increased beyond that necessary to depress the springs 16 and 18. From the roll 12 the film passes to the rear of a plate 24 and in front of a plate 25. The edges of the plate 25 are pivotally connected by links 26, 26 with the edges of the plate 24, thereby allowing the plate 25 to be swung rearwardly and downwardly to separate it from the plate 24 to provide sufficient space to allow the film to be introduced between the two plates.

Journaled in brackets 27 attached to the lower end of the plate 25 is a roller 28 having, near each end, a pair of flanges 29, 29 which are spaced to allow the teeth 30 of sprocket wheels 31, 31 to pass between them. The sprocket wheels are carried upon a shaft 32. Power is applied to produce an intermittent rotation of the sprocket wheels in the direction of the arrow 33, Fig. 3, by means of a crank 34, Fig. 1, applied to a shaft 35 carrying a gear 36, Fig. 2, which engages a pinion 37 turning loosely upon a stud 38, said pinion 37 having attached thereto a gear 39 in mesh with a pinion 40 on a shaft 41. Carried by the shaft 41 is a driving wheel 42 carrying on one side a pin 43, parallel with the axis of the driving wheel and having one end held in the driving wheel and the opposite end preferably supported by a disk 44 which, in the present instance, is integral with the wheel 42 through a connecting hub 45.

As the wheel 42 is rotated, the pin 43 engages the radial slots 46 in a disk wheel 47 carried on the sprocket wheel shaft 32. The disk wheel 47 is divided by the radial slots 46 into four equal sections and, as the slots are successively engaged by the pin 43, the disk wheel 47 and connected sprocket wheel shaft 32 are intermittently rotated one quarter of a revolution. Attached to the sprocket wheel shaft 32 is a disk wheel 48 divided into four equal sections by radial slots 49 which are successively engaged, as the wheel 48 is rotated, by the free end of a lever or dog 50 pivoted at 51 to the framework of the machine, and held in contact with the disk wheel 48 by means of a spiral spring 52. Projecting from the dog 50 is an arm 53, which is normally held in the path of a roller 54 turning upon a stud 55 carried upon the wheel 42.

The slotted disk wheels 47 and 48 are so arranged on the shaft 32 and the operation of the pin 43 and dog 50 are so timed that the dog 50 will be withdrawn from the disk wheel 48 by the engagement of roller 54 with arm 53 at the moment the pin 43 enters one of the slots of the disk wheel 47, and the moment the pin 43 is released from the disk wheel 47, the dog 50 will be raised by the spring 52 into engagement with the disk wheel 48. A series of intermittent movements, each one quarter of a revolution, will be imparted to the sprocket wheel shaft by the successive engagements of the pin 43 with the slots of the disk wheel 47 and, while the pin 43 is disengaged from the disk wheel 47, the sprocket wheel shaft 32 will be positively locked from movement in either direction. The locking and unlocking of the sprocket wheel shaft by means of the dog 50 will be substantially instantaneous, as but a slight movement of the free end of the dog 50 will suffice to either lock or unlock the sprocket wheel shaft.

By my improved method of driving and locking the sprocket wheel, I am enabled to greatly increase the period of rest relatively to the period of movement of the sprocket wheel, making the ratio in some cases as high as nine to one, or greatly in excess of that attained by any of the film feeding mechanisms now in common use. Other means of locking the disk wheel 48 may be employed without departing from the spirit of my invention and I have shown one such modification in Fig. 6, in which the radial slots 49 of the disk wheel 48 are successively engaged by a dog 56 pivoted at 57 to a rigid framework, and having a cam roll 58 which moves in a cam slot 59 on the side of the driving wheel 42. The cam slot 59 is arranged to withdraw the dog 56 from the disk wheel 48 the moment the disk wheel 47 is engaged by the pin 43, and to carry the dog into engagement the moment the pin 43 is withdrawn from the disk wheel 47.

The plate 25 is provided with an opening 60 in alinement with similar openings 61 and 62 in the plate 24 and the case 1, through which light is thrown from a lantern, or other source, upon the screen. Sliding in the plate 25 is a plate 63 having an opening 64 of suitable size to correspond with the size of the picture on the film. The plate 63 is provided with a rack 65 which is engaged by a pinion 66 carried on a shaft 67 and provided with a lever handle 67ª, by which the plate 63 is raised or lowered to expose the complete picture on the screen. At the rear of the opening 64 is a swinging fre shutter 68, which is normally interposed between the lamp placed at the rear of the apparatus and that portion of the film which extends across the opening 64. The fire shutter 68 is pivoted at one end upon a fixed stud 69 and is pivotally connected at 70 to a right angled bracket 71 attached to the upper end of a rod 72, capable of a vertically sliding movement in the case of the machine and pivotally connected at 73 with the free end of a lever 74 pivoted at its opposite end upon a fixed stud 75 and operatively connected at 76 to a centrifugal governor 77. The rapid rotation of the centrifugal governor 77 operates to raise the free end of the lever 74, rod 72, bracket 71 and shutter 68 so as to expose the opening 64 to the direct rays of the lamp.

The centrifugal governor 77 Figs. 1 and 4 is driven from an upright shaft 78 connected by miter gears 79 with the shaft 41. The construction of the governor is similar to that of the ordinary centrifugal governor, in which the rapid rotation of the weights 77 from the shaft 78 will spread the weights and raise the supporting bottom for the weights to which the lever 74 is attached. The shaft 41 is connected by miter gears 80 with a sprocket wheel 81 which, through a chain connection 82, drives a sprocket wheel 83 turning on a fixed stud 84. Carried by the sprocket wheel 83 is a three armed revolving screen 85 provided with two narrow arms 86 and 87 and a wide arm 88. During the operation of the machine the three armed screen is made to revolve rapidly in front of the opening 64, the wide arm 88 passing the opening and obstructing the illumination of the screen during the intermittent movement of the film across the opening, and the narrow arms 86 and 87 passing the opening during the exposure of the picture upon the screen, producing a momentary interruption too short to be noticed by the observer, but, for optical reasons, found to be desirable.

The lower part of the casing is divided by partitions 89 and 90 into three divisions, forming at the outer sides and bottom of the casing chambers 91 and 92 capable of holding lubricating material, that in chamber 91 contacting with the pinion 40 and causing a lubrication of the train of gearing connecting the shafts 35 and 41. The lubricating material in chamber 92 serves to lubricate the driving mechanism for the sprocket wheels 31 and the revolving three armed screen 85. The space between the partitions 89 and 90 is closed by a transverse partition 93, having a passageway 94 between the chambers 91 and 92 to receive the shaft 41 and allow the passage of lubricating material from one chamber to the other. The transverse partition 93 extends over the sprocket wheels 31, forming a shield to protect the latter from any lubricating material which might fall from the chain 82. As the film is delivered from the sprocket wheel 31, it is wound into a coil upon a revolving spindle 95, Fig. 8, which is rotated by a motor 96. As the continuous film passes to the spindle 95, it is passed beneath a roller 97 and over a roller 98. The roller 97 is journaled in the top of a tubular weight 99 capable of sliding upon a vertical post 100. The weight 99 is provided with an electrical contact surface 101 adapted to contact with a fixed electrical contact surface 102, forming the terminals of an electric circuit which includes the motor 96. As soon as the tension upon the film is sufficient to lift the weight 99, the contact surfaces 101 and 102 are separated, thereby breaking the circuit and stopping the motor. Whenever the loop in the film allows the weight 99 to drop so as to bring the contact surfaces 101 and 102 together, the electric circuit is established and the motor 96 set in operation. The tension upon the film is, therefore, confined to that produced by the weight 99.

The continuous strip of film 23, a detached portion of which is shown in Fig. 10, is provided on its opposite edges with a series of small rectangular openings 103 which register with the teeth 30 on the sprocket wheels 31, so that the film is continually drawn past the opening 64 by the intermittent motion of the sprocket wheels 31, the perforated edges of the film being held in engagement with the teeth 30 of the sprocket wheels by means of the flanges 29 on the roller 28. During the intermittent movement of the film, as propelled by the sprocket wheels 31, no strain is exerted between the sprocket wheels and the film coil 5 in excess of the tension of the springs 16 and 18, for any excessive tension upon the film will be exerted upon the roll 12 and serve to bring the contact surfaces 19 and 20 together, thereby completing the electric circuit which includes the motor 21, setting the latter in motion and rotating the film coil in the direction of the arrow 22, Fig. 3. The movement of the coil delivers additional film which allows the contact surfaces 19 and 20 to separate, when the rotation of the film ceases. The springs 16 and 18 and the weight 99 are sufficiently light to prevent any undue tension being exerted upon the film.

I claim,

1. In a kinetograph, a coil of film, means for imparting an intermittent movement to the film as it is delivered from said coil, means for positively rotating the coil to deliver the film therefrom, and means for controlling said rotating mechanism by the tension imparted to the film during its feeding movement.

2. In a kinetograph, a coil of film, coil rotating mechanism to deliver film therefrom, and means for controlling the action of said coil rotating mechanism by the tension of the film.

3. In a kinetograph, the combination with a coil of film, of means for rotating said coil to deliver the film therefrom, a spring actuated yielding mechanism operated by the tension of said film, and means operated by said yielding mechanism for controlling the action of said coil rotating mechanism.

4. In a kinetograph, intermittently rotating sprocket wheels for engaging the edges of the film and a guideway for the film leading to said sprocket wheels, comprising a fixed plate having a surface in alinement with the peripheries of said sprocket wheels and a movable plate having its edges pivotally connected by links with said fixed plate, whereby said movable plate is held parallel with said fixed plate.

5. In a kinetograph, a pair of sprocket wheels adapted to engage the edges of the film, a guideway for the film leading to said sprocket wheels, comprising a pair of plates pivotally connected by links, whereby said plates are maintained parallel, and a roll carried by one of said plates arranged to crowd the film against said sprocket wheels.

Dated this twenty second day of November 1909.

THOMAS H. BLAIR.

Witnesses:
 EZRA H. BIGELOW,
 PENELOPE COMBERBACH.